Patented Oct. 5, 1926.

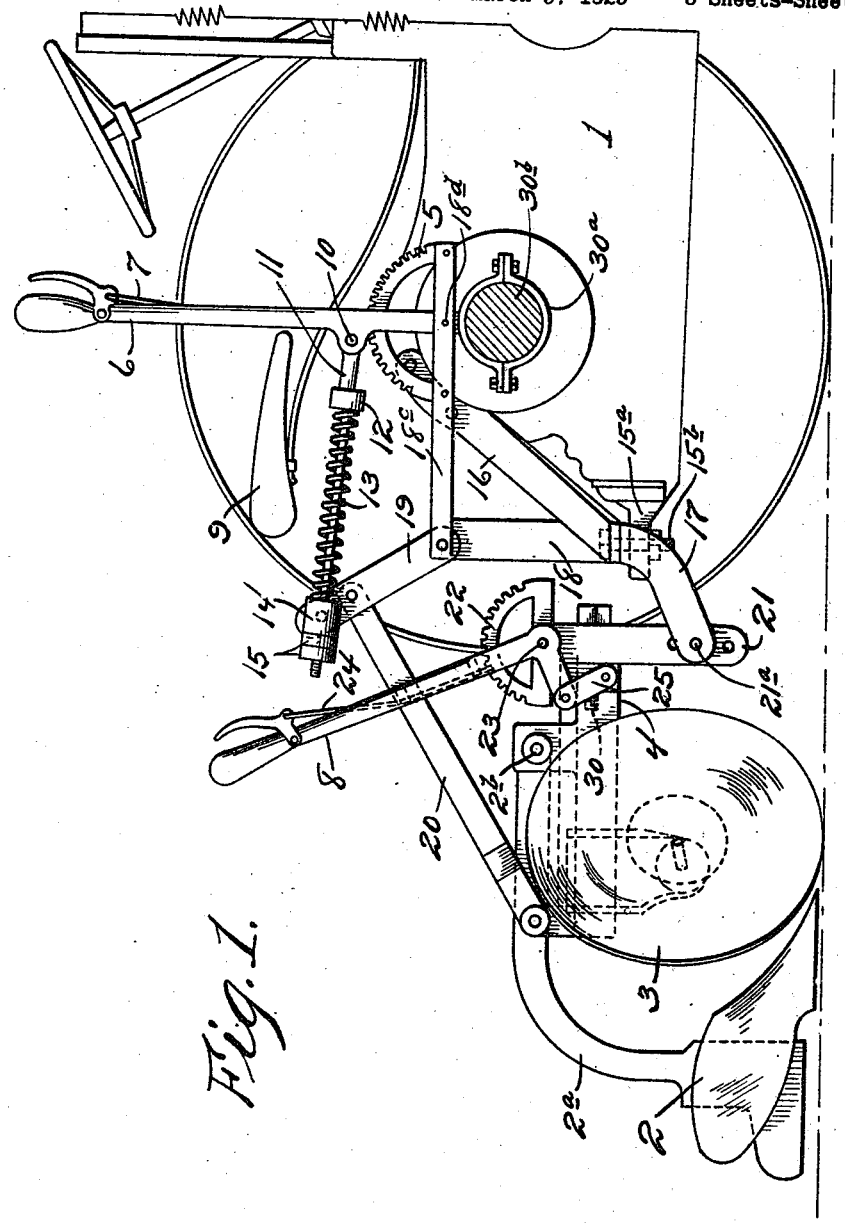

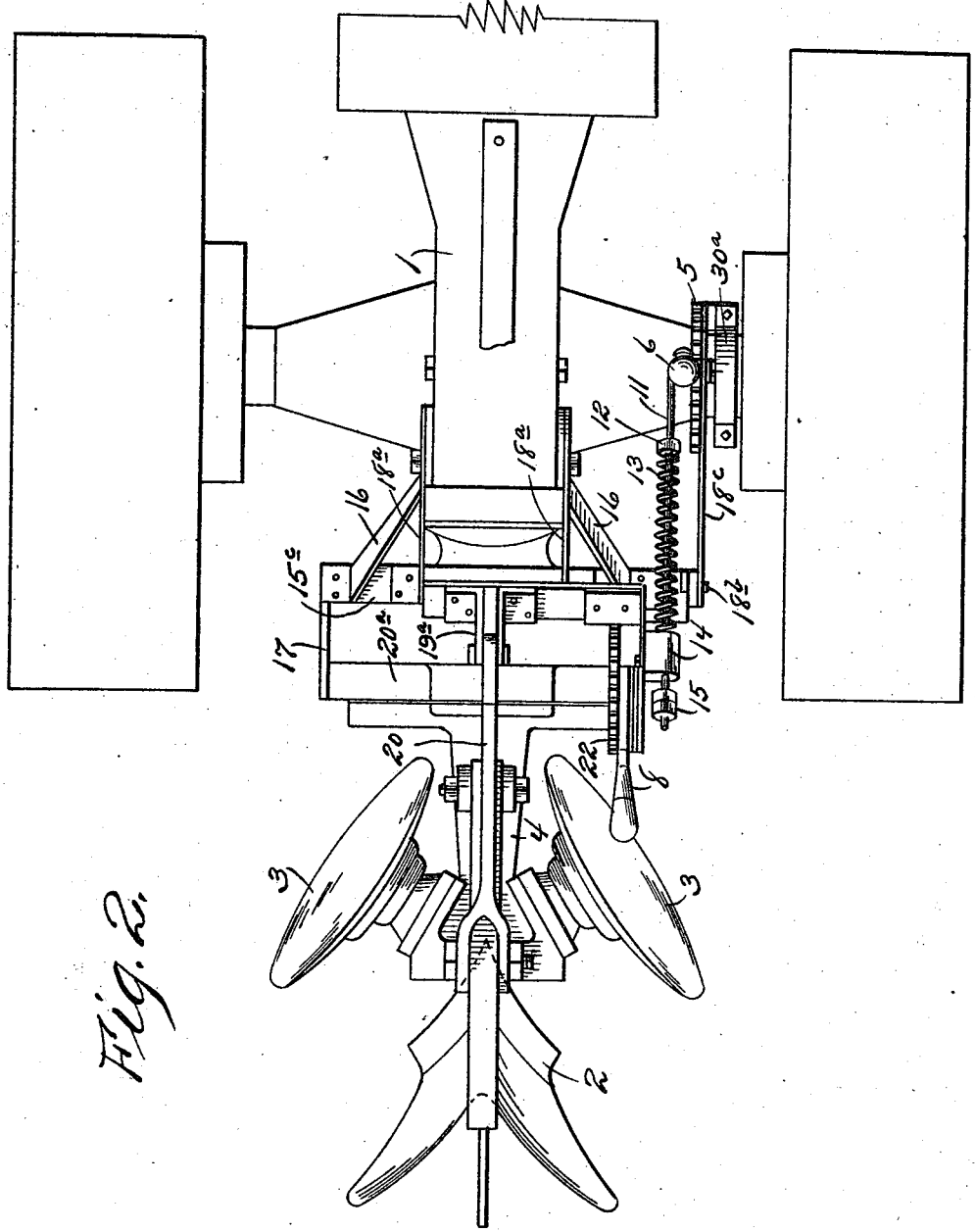

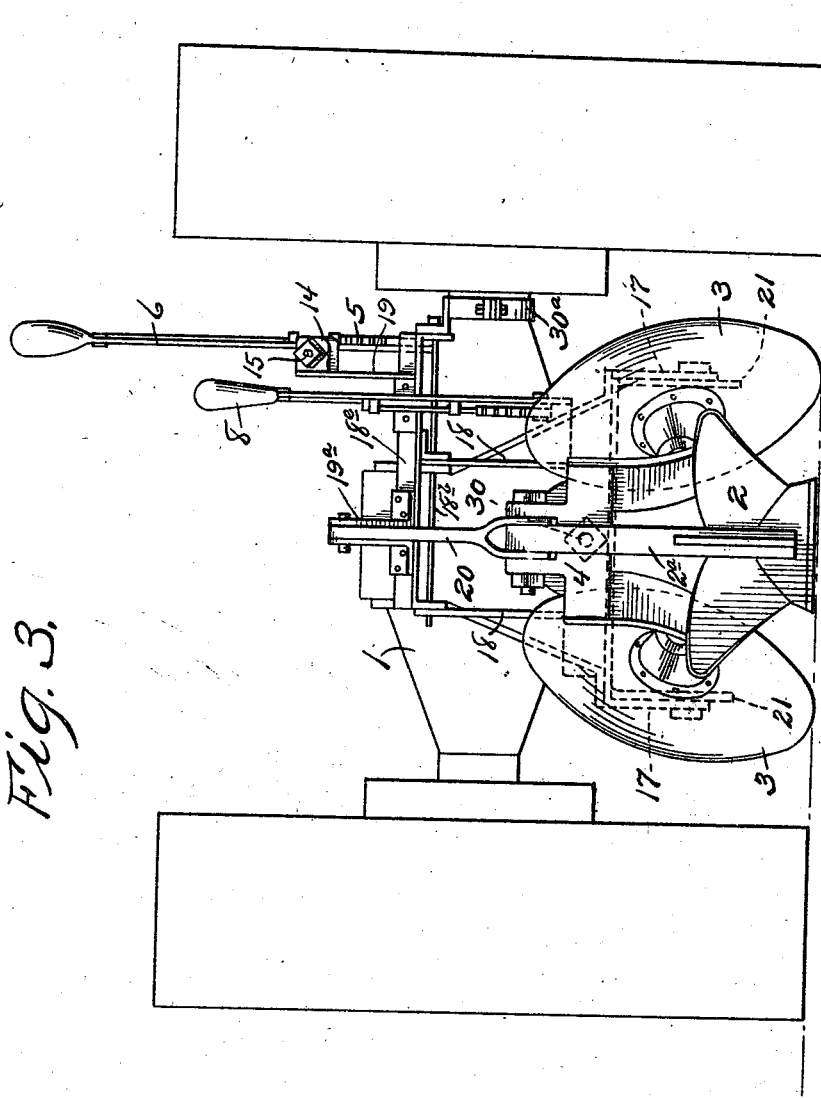

1,602,244

UNITED STATES PATENT OFFICE.

NOEL DE WITT NEWTON AND JAMES ARTHUR NEWTON, OF WINCHESTER, ARKANSAS, ASSIGNORS OF ONE-FOURTH TO JOHN PHILIP HARRINGTON, OF WINCHESTER, ARKANSAS, AND OF ONE-FOURTH TO PINCKNEY S. SEAMAN, OF McGEHEE, ARKANSAS.

BEDDING-PLOW ATTACHMENT FOR TRACTORS.

Application filed March 3, 1925. Serial No. 12,944.

The general object of our present invention is the provision of a bedding plow attachment adapted to be used in any kind of land and in any kind of weather and constructed so that the plow as a unit can be raised clear of the ground, and so that the plow can be accommodated to hill sides and also constructed with a view to operating efficiently in making a complete bed incident to each round trip; the disks forming light furrows, and the middle "buster" throwing the middle.

Other objects and practical advantages of the invention will be fully understood from the following description and claims when the same are read in connection with the drawings, accompanying and forming part of this specification, in which:—

Figure 1 is a view showing the preferred embodiment of our invention in side elevation as properly arranged relative to a well known type of tractor.

Figure 2 is a plan view of the same.

Figure 3 is a rear elevation illustrating the tractor and the improvement.

The tractor illustrated is designated by 1 and is in general of the same construction as a well known type of tractor at present on the market.

Our invention contemplates the employment in connection with the tractor 1 of a double "buster" plow 2, and disks 3, the plow and disks being relatively arranged as illustrated for the purpose indicated and being carried by a T-shaped frame 4 which is preferably of cast iron.

At 5 is a segmental rack adjacent to which is a hand lever 6, having a detent 7 for cooperation with the said rack 5 in adjustably fixing the lever in position. It will also be noticed the lever 6 and a second lever 8 are arranged in convenient proximity to the driver's seat 9 of the tractor.

Pivotally connected at 10 to the lever 6 and extending rearwardly therefrom is a rod 11 on which is a fixed abutment 12 for one end of an expansion spring 13, the other and rear end of which bears against an abutment 14 in rear of which are nuts 15 in threaded engagement with the rear portion of the rod.

At the rear end of its body the tractor 1 is provided with an apertured draw bar 15$^a$, and on the said draw bar 15$^a$ is connected at 15$^b$ a horizontal bar 15$^c$ that is connected by bars 16 with opposite sides of the tractor body. At its ends the bar 15$^c$ is provided with rearwardly and downwardly extending arms 17, and on the bar 15$^c$ at 18 are uprights between which and opposite sides of the tractor body are interposed and connected longitudinal bars 18$^a$. At the right hand end of a transverse rod 18$^b$ is bar 18$^c$, Figure 1 to which is connected a clamp 30$^a$ which surrounds the rear axle 30$^b$ of the tractor. The segmental rack 5 is fixed with respect to said bar 18$^c$, and the hand lever 6 is pivoted to said bar 18$^c$ as designated by 18$^d$. The said transverse rod 18$^b$ is arranged in and supported by the before mentioned apparatus 18 on the bar 15$^c$.

Mounted to swing forwardly and rearwardly on the transverse rod 18$^b$ is a frame 18$^e$, Figure 3, on which is an arm 19 which carries the before mentioned abutment 14. The frame 18$^e$ also carries arms 19$^a$, and pivotally connected between the said arms 19$^a$ is a link 20, the rear end of which is pivotally connected to the rear portion of the T-shaped frame 4, the beam 2$^a$ of the plow 2 is pivoted at 2$^b$ to uprights on the frame 4, and the rear portion of the link 20 is bifurcated as shown so as to straddle the said beam 2$^a$.

Interposed between the rearwardly extending portion 17 on the transverse bar 15$^c$ is a transverse frame 20$^a$ having pendent arms 21 connected at 21$^a$ to the said portions 17.

A segmental rack 22 is fixed to the frame 20$^a$, and the lever 8 is fulcrumed at 23 on said frame and is provided with a detent 24 for cooperation with the rack 22. The said lever 8 is connected by a link 25 with one end of the head or forward portion of the T-shaped frame 4. In this connection it will be understood that the opposed portions of the T-shaped frame 4 and the frame 20$^a$ are pivotally connected by a longitudinal central bolt 30 and consequently it will be understood that by manipulating the lever 8 the T-shaped frame 4 may be swung or adjusted laterally, and by adjustably fixing the lever 8, the said T-shaped frame 4 can be adjustably fixed in various positions. From this it follows that when the plow is operating on a hill side or where old rows have been bedded and either wheel of the tractor is high or low, the entire plow can be leveled to the row or the ground irrespective of the position of the tractor. Manifestly when the lever 6 is moved forwardly, the frame 4 and the parts carried thereby and connected therewith will be moved upwardly, and by adjustably fixing the lever 6 the plow 2 and the disks 3 may be maintained clear of the ground.

Notwithstanding connections between the frame 4 and the lever 6, it will be understood that the spring 13 and the parts cooperating therewith constitute a shock absorber which is adapted to enable the disks to climb or pass over stumps and other large obstructions in their paths.

In this connection it will be understood that upward movement of the frame 4 will be attended by forward movement of the frame 18° and its arm 19 and forward movement of said arm 19 will be cushioned or resisted by the cooperation between the abutment 14 and the spring 13.

With the exception of the T-shaped frame 4 all of the parts of our improvement may be and preferably are formed of steel.

It will be apparent from the foregoing that our improvement is susceptible of being expeditiously and easily adjusted so as to operate to the best advantage, and that when the tractor equipped with our improvement is operated two furrows will be listed through the arm of the disks 3, equalling two light furrows to a bed, while the "buster" 2 will throw out the middle.

We have specifically described the preferred embodiment of our invention in order to impart an exact understanding of said embodiment. We do not desire, however, to be understood as confining ourselves to the specific construction and relative arrangement of parts as disclosed, our invention being defined by our appended claim within the scope of which structural changes can be made without departure from our invention.

Having described our invention, what we claim and desire to secure by Letters-Patent, is:—

A plow attachment comprising a T-shaped frame, disks carried at opposite sides thereof, and a double plow also carried by said frame, and disposed between the said disks; the said plow having a beam extending forwardly above the frame and pivotally connected therewith whereby the plow is adapted to swing upwardly relative to the frame.

In testimony whereof we affix our signatures.

NOEL DE WITT NEWTON.
JAMES ARTHUR NEWTON.